(12) United States Patent
Feldhege et al.

(10) Patent No.: US 11,333,442 B2
(45) Date of Patent: May 17, 2022

(54) BRAZEABLE METAL SHEET MATERIAL, AND HEAT EXCHANGER WITH COMPONENTS MADE OF THE SAME

(71) Applicant: Modine Manufacturing Company, Racine, WI (US)

(72) Inventors: Thomas Feldhege, Leinfelden-Echterdingen (DE); Markus Holmgren, Steinenbronn (DE); Guenther Frischknecht, Aichtal (DE)

(73) Assignee: Modine Manufacturing Company, Racine, WI (US)

( * ) Notice: Subject to any disclaimer, the term of this patent is extended or adjusted under 35 U.S.C. 154(b) by 0 days.

(21) Appl. No.: 15/648,696

(22) Filed: Jul. 13, 2017

(65) Prior Publication Data

US 2018/0017333 A1    Jan. 18, 2018

(30) Foreign Application Priority Data

Jul. 14, 2016   (DE) ..................... 10 2016 008 490.1

(51) Int. Cl.
    *F28D 9/00*    (2006.01)
    *B23K 1/00*    (2006.01)
    (Continued)

(52) U.S. Cl.
    CPC ............ *F28D 9/005* (2013.01); *B23K 1/0012* (2013.01); *B23K 1/203* (2013.01); *F28F 19/06* (2013.01);
    (Continued)

(58) Field of Classification Search
    CPC .. B23K 1/0012; B23K 1/203; B23K 2103/10; B23K 2101/14; F28D 9/005;
    (Continued)

(56) References Cited

U.S. PATENT DOCUMENTS 5,292,595 A * 3/1994 Yamauchi ............ B23K 35/286
    165/134.1
5,476,725 A   12/1995 Papich et al.
(Continued)

FOREIGN PATENT DOCUMENTS

CN       1652925 A    8/2005
CN    104395028 A    3/2015
(Continued)

OTHER PUBLICATIONS

Chinese Office Action for Application No. 2017105766491 dated Jan. 4, 2019 (9 pages, English translation included).
(Continued)

*Primary Examiner* — Gordon A Jones
(74) *Attorney, Agent, or Firm* — Michael Best & Friedrich LLP

(57) ABSTRACT

A brazeable metal sheet material for heat exchanger components is used for producing a heat exchanger by a controlled atmosphere brazing process. The metal sheet material is made up of a core material with a brazing layer at least on one side and a corrosion-reducing intermediate layer arranged between the brazing layer and the core material. The core material consists of an Al3000-series alloy or an Al6000-series alloy having a magnesium content of 0.1% to 1.5% by weight. The brazing layer consists of an Al4000-series alloy having a maximum of 0.2% magnesium by weight. The corrosion-reducing intermediate layer consists of an Al1000-series alloy or an Al7000-series alloy having 0.1% to 1.5% magnesium by weight.

15 Claims, 2 Drawing Sheets

(51) Int. Cl.
  *B23K 1/20* (2006.01)
  *F28F 19/06* (2006.01)
  *F28F 21/08* (2006.01)
  *B23K 101/14* (2006.01)
  *B23K 103/10* (2006.01)
  *F28D 21/00* (2006.01)

(52) U.S. Cl.
  CPC ........ *F28F 21/084* (2013.01); *B23K 2101/14* (2018.08); *B23K 2103/10* (2018.08); *F28D 2021/0082* (2013.01); *F28F 2275/04* (2013.01)

(58) Field of Classification Search
  CPC . F28D 2021/0082; F28F 19/06; F28F 21/084; F28F 2275/04
  See application file for complete search history.

(56) References Cited

U.S. PATENT DOCUMENTS

| | | | | |
|---|---|---|---|---|
| 6,555,251 | B2* | 4/2003 | Kilmer | C22C 21/00 |
| | | | | 138/143 |
| 7,648,776 | B2* | 1/2010 | Vieregge | B23K 35/0238 |
| | | | | 228/262.51 |
| 7,749,613 | B2* | 7/2010 | Koshigoe | C22C 21/16 |
| | | | | 165/905 |
| 8,349,470 | B2* | 1/2013 | Marois | B32B 15/016 |
| | | | | 165/905 |
| 10,006,724 | B2* | 6/2018 | Perrier | B23K 35/0238 |
| 10,486,269 | B2* | 11/2019 | Jacoby | F28F 21/084 |
| 10,898,963 | B2* | 1/2021 | Miyake | B23K 35/286 |
| 2002/0037426 | A1* | 3/2002 | Yamada | B23K 1/0012 |
| | | | | 428/654 |
| 2005/0064226 | A1* | 3/2005 | Benedictus | B23K 35/0238 |
| | | | | 428/654 |
| 2006/0102328 | A1* | 5/2006 | Toyama | B23K 1/0012 |
| | | | | 165/134.1 |
| 2008/0053644 | A1* | 3/2008 | Beetz | F02B 29/0462 |
| | | | | 165/151 |
| 2010/0159272 | A1* | 6/2010 | Marois | B23K 1/0012 |
| | | | | 428/650 |
| 2011/0100615 | A1 | 5/2011 | Henry et al. | |
| 2014/0182821 | A1* | 7/2014 | Perrin | F28F 21/084 |
| | | | | 165/109.1 |
| 2016/0107268 | A1* | 4/2016 | Janssen | B23K 35/0222 |
| | | | | 428/654 |
| 2017/0074604 | A1* | 3/2017 | Perrier | B23K 35/0233 |
| 2017/0320170 | A1* | 11/2017 | Yanagawa | B23K 1/20 |
| 2018/0297138 | A1* | 10/2018 | Yamayoshi | C22F 1/04 |
| 2019/0047092 | A1* | 2/2019 | Bermig | B23K 20/04 |

FOREIGN PATENT DOCUMENTS

| | | | | |
|---|---|---|---|---|
| DE | WO 2007042206 A1 * | 4/2007 | ......... | B23K 35/0238 |
| DE | 2844466 B1 * | 9/2016 | ........... | C22C 19/056 |
| EP | 1637267 A1 | 3/2006 | | |
| EP | 3445520 | 2/2019 | | |
| WO | 2007131727 A1 | 11/2007 | | |
| WO | 2010052231 A1 | 5/2010 | | |
| WO | 2012007452 A1 | 1/2012 | | |
| WO | 2015132482 A1 | 9/2015 | | |
| WO | 2016015917 A1 | 2/2016 | | |

OTHER PUBLICATIONS

Notification of the Second Office Action for Chinese Patent Application No. 2017105766491, National Intellectual Property Administration of the People's Republic of China, Jun. 18, 2019 (10 pages).

European Patent Office Search Report for Application No. 17001057.3 dated Nov. 20, 2017 (8 pages including statement of relevance).

European Patent Office Notification under Article 94 3 for Application No. 17001057.3 dated Sep. 5, 2019 (6 pages including statement of relevance).

* cited by examiner

BRAZEABLE METAL SHEET MATERIAL, AND HEAT EXCHANGER WITH COMPONENTS MADE OF THE SAME

CROSS-REFERENCE TO RELATED APPLICATIONS

This application claims priority to German Patent Application No. 10 2016 008 490.1, filed on Jul. 14, 2016, the entire contents of which are hereby incorporated by reference.

BACKGROUND

The present invention relates to a semifinished product for semifinished components for producing a heat exchanger, to a heat exchanger assembly that is made up of semifinished components and is prepared for subsequent controlled atmosphere brazing, to a brazing process for producing heat exchangers from semifinished components and to a heat exchanger produced by a controlled atmosphere brazing process.

There is an increasing tendency at present to search for possible ways of reliably brazing aluminum heat exchangers without a wetting agent or flux, such as for example potassium aluminum tetrafluoride, Nocolok or the like, since the wetting agent is known to lead to problems during the subsequent intended use of the heat exchanger.

One possible variant of brazing without flux is for example the vacuum brazing process, in which the brazing of the heat exchanger takes place in a vacuum. In the case of this process, magnesium is usually added to the core material, and possibly also to the coatings applied to the core material, in order on the one hand to facilitate the breaking up of the oxide film on the surface and on the other hand to remove any still remaining free residual oxygen from the direct vicinity of the material surface on the basis of the gettering effect. The magnesium escaping from the material thereby reacts with the oxygen molecules located in the vicinity of the surface, with the result that a partial depletion of oxygen occurs in the remaining vacuum, at least in the region of the material surfaces. As a result, reoxidation or increased oxidation of the surface of the material is reduced or prevented, and the surface has sufficiently good brazing characteristics of the brazing layer located on the surfaces. However, a disadvantage of the vacuum brazing process is the usual design as a batch process, with the result that continuous production of heat exchangers can only be made possible with great constructional complexity.

By contrast with the vacuum brazing process, the controlled atmosphere brazing process—another production process for aluminum heat exchangers—can be performed in a continuous process. Such a process employs a protective gas atmosphere to prevent oxidation, instead of a vacuum. Low-oxygen nitrogen gas may, for example, be used as the protective gas, with which the continuous brazing apparatus is flooded. In the case of the controlled atmosphere brazing process, it is usual, however, to use fluxes, such as for example potassium aluminum fluorides, for improving the wettability of the surfaces. During the later intended use of the heat exchangers, these fluxes may however tend to cause a degradation of the respective fluid flowing through the fluid channels in such a way that precipitates form, which can cause formation of a gel that has an adverse effect on the performance of the heat exchanger. This gel formation may in the most extreme case even lead to partial clogging of the fluid channels. Accordingly, there is an increasing tendency to search for possible ways of replacing such fluxes or dispensing with them entirely.

EP 1 637 267 A1 discloses a process for brazing aluminum components that is designed as a controlled atmosphere brazing process and dispenses with the use of flux. One of the ways in which this is achieved is that magnesium is added to the core material of the semifinished product used. The presence of the magnesium in the core material, which diffuses into the brazing layer during the brazing process, allows the oxide film on the material surface to be broken up during the brazing process, and as a result the wettability of the brazing layer during the brazing process to be improved. Moreover, the core material is usually provided with a brazing layer that has a lower magnesium content. This makes it possible to prevent an oxide film that has a high magnesium oxide content from forming on the material surface in advance, which would be broken up less well by magnesium. During the brazing operation, the magnesium that is present in the core material consequently diffuses through the brazing layer and establishes a sufficiently good wettability of the brazing layer on the surfaces. A corresponding design of the brazing apparatus also allows a protective gas atmosphere that comprises less than 20 ppm oxygen to be successfully built up. Such a low oxygen content in the protective gas atmosphere likewise allows sufficiently good brazing of the components to be successfully achieved without the use of fluxes, one reason being a low reoxidation rate as a result of the greatly reduced oxygen content. Since in the case of this process at least two brazing chambers are used, this process is however structurally complex and cost-intensive.

SUMMARY

In one aspect of the invention, a semifinished product for semifinished components for producing a heat exchanger, in particular by a controlled atmosphere brazing process, is made up of a core material with a brazing layer at least on one side and a corrosion-reducing intermediate layer arranged between the brazing layer and the core material. The core material consists of an Al3000-series alloy or an Al6000-series alloy which comprises 0.1% to 1.5% magnesium, the brazing layer consists of an Al4000-series alloy which comprises a maximum of 0.2% magnesium, the corrosion-reducing intermediate layer consists of an Al1000-series alloy or an Al7000-series alloy which comprises 0.1% to 1.5% magnesium.

Advantageously, such a semifinished product can be used to produce semifinished components that can be brazed by means of a controlled atmosphere brazing process, possibly of a continuous design, to form a heat exchanger. This is successfully achieved by the corrosion-reducing intermediate layer having an identical or at least similar magnesium content to the core material, with the result that, as a result of the activation on account of the thermal energy during the heating-up process, the magnesium can diffuse to the brazing layer or the surface of the brazing layer without too low a magnesium content of the corrosion-reducing intermediate layer causing it to be captured by the latter. Accordingly, the use of such a semifinished product allows the corrosion properties in the finished heat exchanger to be advantageously improved and a controlled atmosphere brazing process without the use of flux to be used.

A semifinished product is understood here as meaning a metal sheet or an aluminum metal sheet, possibly wound up on a roll, from which semifinished components can be produced. In this case, the semifinished product may consist of a core material and be provided with a brazing layer at least on one side. This brazing layer may for example be applied by cladding the core material. It is likewise conceivable that the semifinished product has at least on one side a corrosion-reducing intermediate layer, which is arranged between the brazing layer and the core material. Such a corrosion-reducing intermediate layer may likewise be applied by cladding the core material.

Semifinished components are understood as meaning components that are produced from a semifinished product by punching, stamping, forming or the like. Such semifinished components may be formed as shells or half-shells, which when arranged in relation to one another and brazed together form a heat exchanger. The term semifinished components likewise comprises flange plates, terminal plates, end plates, base plates, lamellae, turbulence inserts or the like.

At the same time, on the side, on one side, on two sides or a side of a semifinished product or of a semifinished component is understood as meaning the upper side or underside of the flat-formed semifinished product or the upper side and the underside of the semifinished component. Accordingly, when referring to the semifinished product or the semifinished component, a distinction is drawn between the upper side, the underside and the peripheral edge and peripheral regions.

If the semifinished components are put together to form a heat exchanger assembly, such a prepared heat exchanger assembly can be formed into a heat exchanger by brazing. Consequently, a heat exchanger assembly is understood as meaning a number of semifinished components that are arranged in relation to one another and possibly fastened together and, thus prepared, become a heat exchanger by subsequent brazing.

A core material of a semifinished product should be understood as meaning the layer of the semifinished product arranged in the middle, which usually has the greatest thickness. The brazing layer should be understood as meaning the layer of the semifinished product arranged on the surface, which has brazing properties and by means of which the semifinished components can be brazed together to form the heat exchanger.

A corrosion-reducing intermediate layer is a layer that imparts to the material unit consisting of the core and possibly a brazing alloy an improved corrosion property in comparison with a core material without the intermediate layer and/or the brazing layer. The corrosion reduction can be achieved by the corrosion-reducing intermediate layer being made less noble by the chemical composition than for example the core material. In this case it is possible that, in a corrosion attack, the corrosion-reducing intermediate layer sacrifices itself in favor of the core material, and to this extent displays its corrosion-reducing effect. It may be arranged between the brazing layer and the core material or else be arranged at least on one side as the uppermost layer on the semifinished product. If the corrosion-reducing intermediate layer is the uppermost layer of the semifinished product, the brazing material for brazing the semifinished components may necessarily be provided by another component or by brazing pastes or otherwise applied brazing material. Since the semifinished components are ultimately produced from the semifinished product, the semifinished components are also built up in a way analogous to the semifinished product with regard to their layer structure.

The controlled atmosphere brazing process is understood as meaning a brazing process using a controlled protective gas atmosphere that has such a low oxygen content that reoxidation of the broken-up aluminum surfaces during the brazing is reduced in such a way that sufficiently good brazing of the semifinished components is made possible.

The figures indicated above or below in % for the concentration of constituents are to be understood in particular as % by weight.

It is in this case also conceivable that the core material comprises 0.1% to 1.25% magnesium, for example 0.1% to 1.0% magnesium, in particular 0.1% to 0.6% magnesium and possibly 0.2% to 0.4% magnesium.

It is likewise conceivable that the brazing layer comprises a maximum of 0.15% magnesium, for example a maximum of 0.1% magnesium, in particular comprises a maximum of 0.08% magnesium and possibly comprises a maximum of 0.05% magnesium.

It is also conceivable that the corrosion-reducing intermediate layer comprises 0.1% to 1.25% magnesium, for example 0.1% to 1.0% magnesium, in particular 0.1% to 0.6% magnesium and possibly 0.2% to 0.4% magnesium.

Also, the core material may comprise 0.0% to 0.9% silicon, for example 0.0% to 0.8% silicon, possibly 0.0% to 0.7% silicon and for example 0.0% to 0.6% silicon.

The aforementioned concentrations of silicon advantageously have the effect in the Si diffusion from the brazing alloy into the core material that occurs during the brazing of forming precipitates in the peripheral zones, which form an electrochemically protective layer.

Furthermore, the core material may comprise 0.0% to 0.6% iron, in particular 0.0% to 0.5% iron, possibly 0.0% to 0.4% iron and for example 0.0% to 0.3% iron.

Iron advantageously forms with manganese and/or silicon precipitates that assist the formation of an electrochemical layer, in particular an electrochemically protective layer.

Furthermore, the core material may comprise 0.0% to 1.25% copper, 0.0% to 1.2% copper, in particular 0.0% to 1.0% copper and for example 0.0% to 0.7% copper.

Copper advantageously increases the electrochemically free potential, with the result that a corrosion attack is restricted to the electrochemically less noble regions, whereby corrosion possibly occurring can to the greatest extent be kept away from the core material.

Furthermore, the core material may comprise 0.6% to 1.9% manganese, in particular 0.7% to 1.6% manganese, possibly 0.8% to 1.5% manganese and for example 0.9% to 1.4% manganese.

Manganese advantageously increases the strength of the respective material and for example with silicon forms precipitates in the layers affected by an Si diffusion occurring, the precipitates in the aforementioned layers lowering the electrochemical potential and accordingly acting as superficial sacrificial layers, with the result that the core material can to the greatest extent be protected from corrosion.

Furthermore, the brazing layer may comprise 6.5% to 12.5% silicon, for example 6.5% to 12% silicon, in particular 6.5% to 11% silicon and for example 6.5% to 10.5% silicon.

Aluminum and silicon advantageously form a eutectic at 577° C., with the result that the addition of an aforementioned amount of silicon to an aluminum alloy allows the forming of a brazing alloy that at least partially melts during the brazing and brazes the components together.

Furthermore, the brazing layer may comprise 0.2% to 2.5% zinc, in particular 0.3% to 2.5% zinc, for example 0.4% to 2.0% zinc and possibly 0.5% to 1.0% zinc.

Furthermore, the corrosion-reducing intermediate layer may comprise 0.2% to 2.5% zinc, in particular 0.3% to 2.5% zinc, possibly 0.4% to 2.0% zinc and for example 0.5% to 1.0% zinc.

Zinc advantageously lowers the electrochemical free potential of the respective material, with the result that the layer formed from the material can serve as a sacrificial layer with respect to more noble regions, in particular the core material.

If the corrosion-reducing intermediate layer has a thickness of 10 to 200 μm, a significant improvement in the corrosion characteristics of the finished heat exchanger can be advantageously achieved with only little use of material, since such a thickness represents sufficient corrosion protection with respect to the aggressive media that usually flow in the fluid channels.

Also, the corrosion-reducing intermediate layer may have a thickness of 15 to 175 μm, in particular of 20 to 150 μm, possibly of 25 to 100 μm and for example of 30 to 75 μm.

If the semifinished product has a material sequence of core material/corrosion-reducing intermediate layer/brazing layer, the controlled atmosphere brazing process with at least reduced use of flux can be advantageously carried out at least on one side, the corrosion properties of the heat exchanger being improved on account of the corrosion-reducing intermediate layer used, at least in the fluid channels with such a corrosion-reducing intermediate layer.

If the material sequence is brazing layer/core material/corrosion-reducing intermediate layer/brazing layer, a low-flux or flux-free controlled atmosphere brazing process can be used on both sides, an improvement in the corrosion characteristics of the heat exchanger being possible in the associated fluid channels at least on one side on account of the use of the corrosion-reducing intermediate layer.

If then a material sequence of brazing layer/corrosion-reducing intermediate layer/core material/corrosion-reducing intermediate layer/brazing layer is used, with such a semifinished product a flux-free controlled atmosphere brazing process can advantageously be used on both sides, it being possible for the corrosion resistance of the heat exchanger in the associated fluid channels to be improved on both sides on account of the use of the corrosion-reducing intermediate layer.

In a further aspect of the invention, a heat exchanger assembly that is made up of semifinished components and is prepared for subsequent controlled atmosphere brazing is proposed, at least some semifinished components comprising a core material of an AL3000 alloy or an AL6000 alloy which comprises 0.1% to 1.5% magnesium and has on one side or on two sides a brazing layer of an AL4000 alloy which comprises a maximum of 0.2% magnesium.

When using such a prepared heat exchanger assembly, controlled atmosphere brazing can be advantageously carried out, since the oxide films lying on the surfaces can be broken up by means of the magnesium and, on account of the gettering effect, the microscopic protective gas atmosphere can have a reduced or even no free oxygen content, at least near the surface.

It is in this case also conceivable that the core material comprises 0.1% to 1.25% magnesium, for example 0.1% to 1.0% magnesium, in particular 0.1% to 0.6% magnesium and possibly 0.2% to 0.4% magnesium.

It is likewise conceivable that the brazing layer comprises a maximum of 0.15% magnesium, for example a maximum of 0.1% magnesium, in particular a maximum of 0.08% magnesium and possibly a maximum of 0.05% magnesium.

In a further aspect of the invention, a heat exchanger assembly prepared for subsequent controlled atmosphere brazing is proposed, at least some semifinished components being produced from a semifinished product as described above and accordingly having at least on one side, arranged between the brazing layer and the core material, a corrosion-reducing intermediate layer of an AL1000 alloy or an AL7000 alloy which comprises 0.1% to 1.5% magnesium.

The use of such a heat exchanger assembly advantageously makes it possible to use a controlled atmosphere brazing process and to dispense with the use of fluxes. Moreover, on account of the corrosion-reducing intermediate layer, the heat exchanger produced from the heat exchanger assembly is of an improved design at least in certain portions with regard to corrosion, at least in predetermined fluid channels, as a result of which the overall corrosion properties of the heat exchanger are improved.

It is also conceivable that the corrosion-reducing intermediate layer comprises 0.1% to 1.25% magnesium, for example 0.1% to 1.0% magnesium, in particular 0.1% to 0.6% magnesium and possibly 0.2% to 0.4% magnesium.

Also, the brazing layer may be arranged in a future gas-carrying fluid channel on the semifinished component.

As a result, controlled atmosphere brazing can be advantageously performed in the gas-carrying fluid channel. One reason why this is successfully achieved is because the future gas-carrying fluid channels are usually preformed in the prepared heat exchanger assembly and also are substantially only flowed through to a lesser extent by the surrounding protective gas atmosphere during the brazing process. Accordingly, the microscopic protective gas atmosphere, which can have a reduced oxygen content in comparison with a macroscopic protective gas atmosphere prevailing in the brazing apparatus, can form future gas-carrying fluid channels. This allows the free oxygen content to be lowered in the region of the surfaces to be brazed to the extent that low-flux or flux-free controlled atmosphere brazing is made possible.

Also, a brazing layer may be arranged in a future liquid-carrying fluid channel.

Since especially in the case of a future liquid-carrying fluid channel it is unlikely that there will even be a slight throughflow of the same by the surrounding protective gas atmosphere, a disturbing exchange of the atmosphere directly at the contact areas or surfaces to be brazed is minor or non-existent, with the result that the oxygen reduction occurring on account of the gettering effect is not impaired, or only slightly, during the brazing process by after-flowing protective gas that contains unavoidable residual amounts of oxygen. It is thus possible specifically with future liquid-carrying fluid channels to dispense with the use of flux during the controlled atmosphere brazing process.

Furthermore, the corrosion-reducing intermediate layer may be arranged in a future gas-carrying fluid channel. In this case, the corrosion resistance in the gas-carrying fluid channel can be advantageously improved in the heat exchanger produced from the heat exchanger assembly.

Furthermore, the corrosion-reducing intermediate layer may be arranged in a future liquid-carrying fluid channel. As a result, the corrosion properties of the liquid-carrying fluid channels can be likewise advantageously improved in the finally assembled heat exchanger.

A future gas-carrying fluid channel and a future liquid-carrying fluid channel are understood here as meaning the regions or channels of the heat exchanger assemblies that form a respective gas-carrying fluid channel or liquid-carrying fluid channel after brazing of the heat exchanger assembly to form the heat exchanger.

In a further aspect of the invention, a brazing process for producing heat exchangers from semifinished components is proposed, in which a heat exchanger assembly according to one of the preceding claims is brazed by means of a controlled atmosphere brazing process to form a heat exchanger.

When using such semifinished components, a controlled atmosphere brazing process can be advantageously used without fluxes having to be used.

Also, the macroscopic protective gas atmosphere in a brazing apparatus may have an oxygen content of 10 to 500 ppm.

With a still relatively high oxygen content in the macroscopic protective gas atmosphere, the controlled atmosphere brazing process can nevertheless be advantageously carried out, and with reduced use of flux or without the use of flux. It is accordingly possible to use a more favorable protective gas and/or to dispense to the greatest extent with an expensive and laborious lowering of the oxygen content in the protective gas atmosphere, possibly by means of structural measures such as the use of two or more brazing apparatuses.

It is also conceivable that the oxygen content of the macroscopic protective gas atmosphere has an oxygen content of 20 to 500 ppm, in particular of 50 to 500 ppm, possibly of 70 to 500 ppm and for example of 100 to 500 ppm.

In a further aspect of the invention, a heat exchanger, produced by a controlled atmosphere brazing process is proposed, in particular as described above, using semifinished components, in particular as described above, that are produced from semifinished products, in particular as described above.

Advantageously, by means of the controlled atmosphere brazing process a heat exchanger that is formed without flux can be produced, or at least a heat exchanger that is formed with little flux can be produced, without the flux having to be laboriously removed from the heat exchanger after it has been produced. Consequently, the disadvantageous precipitates from the fluid respectively used that are caused by chemical interaction with residues of flux also do not occur in the case of a heat exchanger produced in such a way, or only to a slight extent.

The heat exchanger may also be designed as a liquid-cooled charge-air cooler.

It is advantageously possible in this case to dispense with the use of flux, at least in the region of the liquid-carrying fluid channels, or to use it to a reduced extent, because in the case of a liquid-cooled charge-air cooler the liquid-carrying fluid channels are formed as almost closed with respect to the surrounding macroscopic protective gas atmosphere also in the case of the prepared heat exchanger assembly, with the result that, on account of the gettering effect of the magnesium, a microscopic protective gas atmosphere with a lower oxygen content than the macroscopic protective gas atmosphere that prevails in the brazing apparatus can be formed in the region of the liquid-cooled fluid channels. Accordingly, in the case of liquid-cooled charge-air coolers, a protective gas atmosphere with a higher oxygen content can be used without flux being necessary for the brazing, since, because of the type of construction, there is little if any mixing of the protective gas atmosphere or throughflow of the same in the future liquid-carrying fluid channels.

It is however conceivable that also in the case of a liquid-cooled charge-air cooler it is possible to dispense with a flux in the gas-carrying fluid channels, since it is likewise possible in these gas-carrying fluid channels already with the prepared heat exchanger assembly to make any penetration or mixing of the macroscopic protective gas atmosphere into the microscopic region of the gas-carrying fluid channels extremely minimal. To this extent, the gettering effect of the magnesium can also act in an oxygen-reducing manner on the microscopic protective gas atmosphere in the region of the brazing locations in the gas-carrying fluid channels, without the reduction of the oxygen content of the residual-oxygen-containing macroscopic protective gas atmosphere that penetrates into the gas-carrying fluid channels being nullified to any significant extent in the microscopic region.

The heat exchanger may also be formed in a shell type of construction.

Especially with the shell type of construction, fluid channels can be advantageously formed as closed to the greatest extent with respect to the surroundings and such that, with them, an exchange of the microscopic protective gas atmosphere in the fluid channels with the macroscopic protective gas atmosphere in the brazing apparatus is to the greatest extent ruled out or reduced.

The heat exchanger may also be formed in a plate type of construction.

In the case of this type of construction, fluid channels of which the microscopic protective gas atmosphere is substantially not in constant exchange with a macroscopic protective gas atmosphere can be advantageously formed at least within the plates, so that also in this case the gettering effect of the magnesium can lead to a reduction of the oxygen content in the microscopic protective gas atmosphere or in the region of the brazing region.

A macroscopic protective gas atmosphere is understood here as meaning the composition of the protective gas in the brazing apparatus, in particular in the region that is arranged between the heat exchangers and that surrounds the heat exchangers or the heat exchanger assemblies prepared for brazing. A microscopic protective gas atmosphere is understood as meaning the composition of the protective gas in the region of the fluid channels or in the region of the components to be brazed or in the region of the brazing locations. With specific types of construction, the microscopic protective gas atmosphere in the region of the fluid channels is in this case formed substantially as largely encapsulated with respect to the macroscopic protective gas atmosphere, with the result that an exchange of the microscopic protective gas atmosphere with the macroscopic protective gas atmosphere substantially does not take place, or only occurs to a very slight extent.

DETAILED DESCRIPTION

Figure 1:
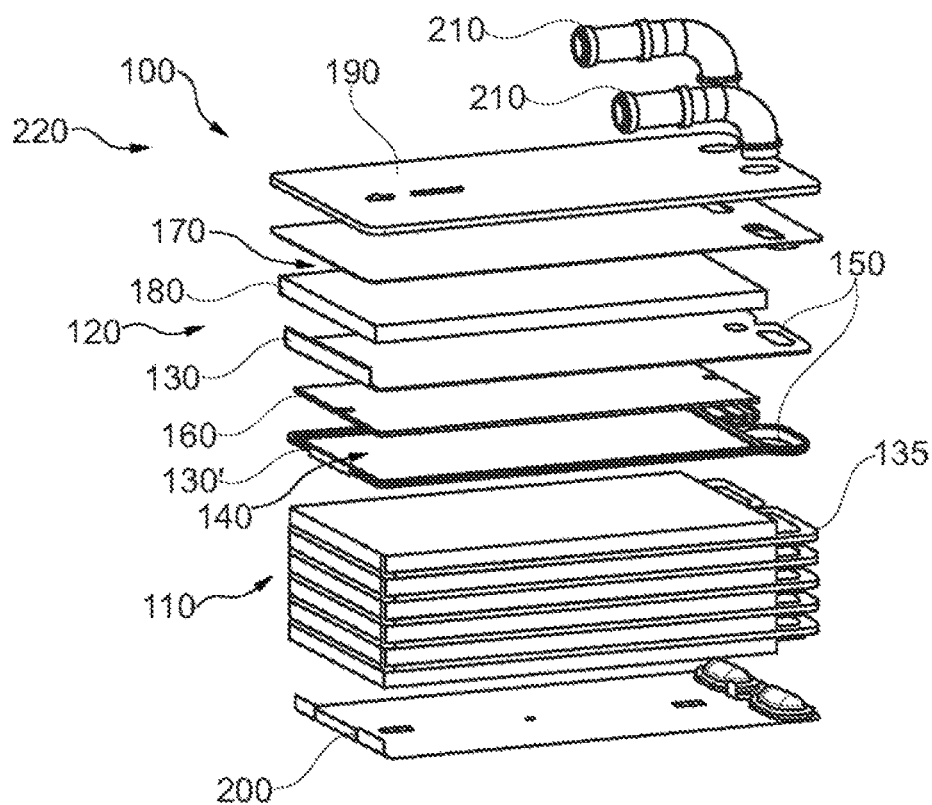
FIG. 1 is an exploded view of a heat exchanger having a plate type of construction.

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

A heat exchanger 100 in the plate type of construction 110 includes, as a prepared heat exchanger assembly 120, a number of half-shells 130, 130', which respectively brazed together in pairs form a pair of plates 135. Respectively formed between these half-shells 130, 130' connected to one another in pairs, that is to say within the pairs of plates 135, there is a first fluid channel 140, in which a first fluid flows in the finally assembled heat exchanger 100. The first fluid thereby enters such first fluid channels 140 by way of domes 150, which are likewise formed from the half-shells 130, 130' by brazing.

In these first fluid channels 140, an insert 160, in particular a turbulence insert 160, may be fitted.

On account of the stacked type of construction, between the pairs of plates 135 formed from the half-shells 130, 130' there are formed further, second fluid channels 170, in which inserts 180, in particular formed as lamellae, may likewise be fitted. Both the inserts 160 and the inserts 180 may be brazed to the half-shells 130, 130' or to the pairs of plates 135 in the finally assembled heat exchanger 100. Furthermore, the heat exchanger 100 may have a terminating flange plate 190 and a terminating base plate 200.

Moreover, connection nozzles 210, by means of which the first fluid can be fed by way of the domes 150 to the first fluid channels 140 and discharged from the first fluid channels, may be arranged on the flange plate 190.

The complete heat exchanger assembly 120 that is shown accordingly comprises semifinished components that may be formed as half-shells 130, 130', inserts 160, pairs of plates 135, inserts 160, 180, flange plates 190, base plates 200 and connection nozzles 210. It is also conceivable here that yet other semifinished components are used.

A heat exchanger 100 formed in such a way in the plate type of construction 110 may be used for example as a liquid-cooled charge-air cooler 220, the first fluid being provided as a liquid, for example as cooling liquid comprising water and/or glycol and/or corrosion inhibitors, in this case the cooling liquid being supplied to the first liquid channels 140 and discharged from the first liquid channels 140 by way of the connection nozzles 210. The second fluid, which is provided as charging air and may optionally contain at least a proportion of exhaust gas, thereby flows through the second fluid channels 170. In this case it is a liquid-gas heat exchanger. It is however also conceivable that the second fluid is likewise formed as a liquid, with the result that in this case it is a liquid-liquid heat exchanger. It is similarly possible that alternatively either the first fluid or the second fluid is used as a two-phase fluid, which is at least partially transformed in the heat exchanger from the gaseous state of aggregation into the liquid state of aggregation. In this case, the heat exchanger can be designed as a condenser.

Figure 2:
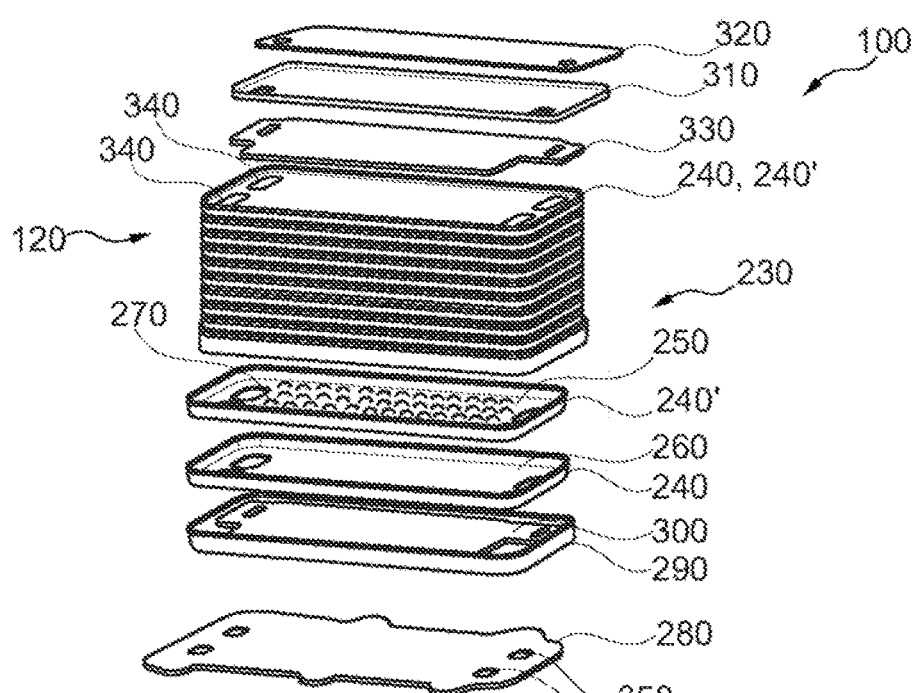
FIG. 2 is an exploded view of a heat exchanger having a shell type of construction.

The heat exchanger 100 according to FIG. 2 is made in the shell type of construction 230 and comprises a number of tube shells 240, 240'. These tube shells 240, 240' are fitted in one another and, because of the way in which they are fitted in relation to one another, form first fluid channels 250 and second fluid channels 260. In this case, the first fluid channel 250 is flowed through by a first fluid and the second fluid channel 260 is flowed through by a second fluid. Inserts may be positioned in the first fluid channels 250 and/or in the second fluid channels 260 and/or the tube shells 240, 240' may be provided with dimple-shaped protuberances 270, which on the one hand may serve for providing support on the next tube shell 240, 240', and for increasing the tensile strength, and on the other hand may form microscopic fluid channels in the first fluid channels 250 and the second fluid channels 260.

The heat exchanger 100 may also be provided with an end flange plate 280, which is connected to a base tube shell 290, in which an insert 300 and the next normal tube shell 240, 240' may be fitted. On the side opposite from the flange plate 280, the heat exchanger 100 may be terminated by an end tube shell 310, which is fitted in the last tube shell 240, 240', and/or by an end plate 320, which is arranged in the end tube shell 310 or in the last tube shell 240, 240'. An insert 330 may be arranged between the end tube shell 310 and the last normal tube shell 240, 240'.

The first fluid channels 250 and the second fluid channels 260 may in this case be supplied with the respective fluid by way of domes 340 formed from the tube shells 240, 240'.

Such a heat exchanger 100 may be designed as a liquid-cooled oil cooler 345, the first fluid channels 250 being flowed through for example by the cooling liquid, water and/or glycol and/or corrosion inhibitors, while the second fluid channels 260 are flowed through by the oil to be cooled. In this case, the first fluid and the second fluid can be fed to and discharged from the first fluid channels 250 and the second fluid channels 260 by means of the domes 340, by way of openings 350 formed in the flange plate 280.

In the case of the heat exchanger 100 shown in FIG. 2, semifinished components 360 may accordingly be formed as tube shells 240, 240', flange plates 280, base tube shells 290, inserts 300, end tube shells 310, end plates 320 and inserts 330.

Figure 3:
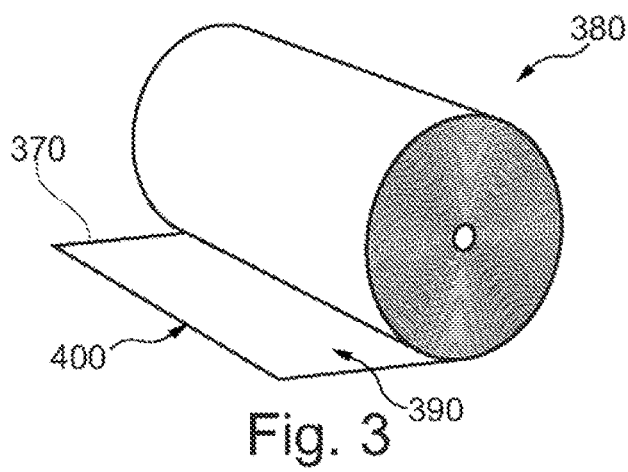
FIG. 3 shows a semifinished product wound up onto a roll.

Such semifinished components 360 may be produced from a semifinished product 370, such as the metal sheet material shown in FIG. 3. Such semifinished products 370 may be used in the process while wound up on a roll 380, the semifinished product 370 having an upper side 390 and an underside 400. Accordingly, in the case of a semifinished product 370, a formation on one side or on two sides should be understood in each case as meaning formation on the upper side 390 and/or on the underside 400. In the case of the semifinished components 360, the aforementioned terminology refers to the respective original upper side 390 and/or underside 400 of the semifinished product 370.

Figure 4:
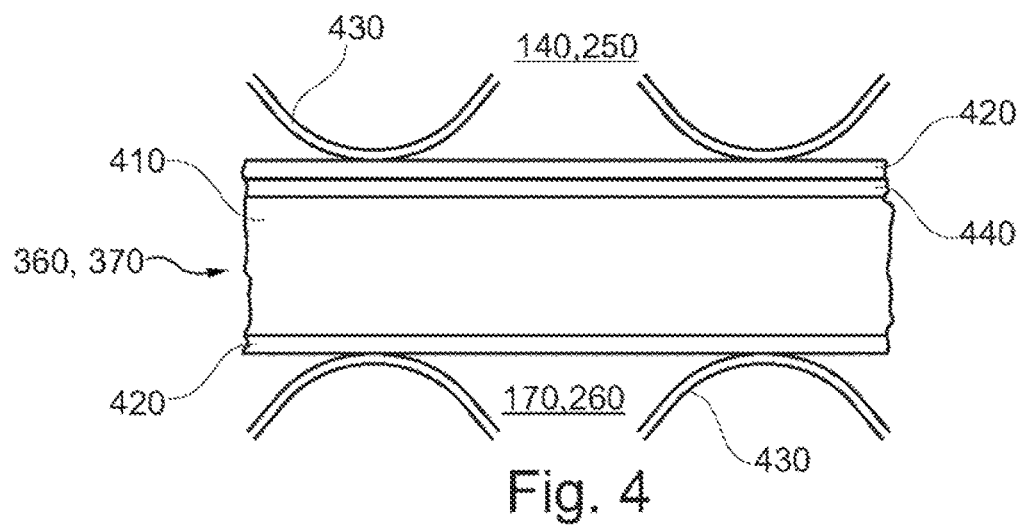
FIG. 4 shows a cross section through a semifinished product in the installed position in a heat exchanger assembly prepared for subsequent brazing.

Such a semifinished product 370 or such a semifinished component 360, as shown in FIG. 4, may comprise in cross section and in the installed position in the heat exchanger assembly 120 a core material 410, which usually has the greatest thickness. At least on one side, a brazing layer 420 may directly adjoin the core material 410.

Structures 430 of further semifinished components 360, such as for example dimple-shaped protuberances 270, inserts 180, which may be formed as lamellae, or inserts 160, 300, 330, which may be formed as turbulence inserts, can be brazed by means of such a brazing layer 420.

It is also conceivable that such a brazing layer 420 adjoins the core material 410 on both sides.

At least on one side there may be arranged adjacent to the core material 410 a corrosion-reducing intermediate layer 440, which may in turn be adjoined by a brazing layer 420. In this case, a brazing of the structures 430 of other semifinished components 360 is likewise achieved with the brazing layer 420, the corrosion-reducing intermediate layer 440 having the effect after the brazing of providing an improvement in the corrosion resistance of the heat exchanger, at least in the adjacent fluid channel 140, 170, 250, 260.

In the case of the plate type of construction 110, as shown in FIG. 1, it is conceivable that a corrosion-reducing intermediate layer 440 is only provided in the second fluid channel 170, whereas in the first fluid channel 140 only the brazing layer 420 is to be found in the heat exchanger assembly 120. Accordingly, a corrosion-reducing intermediate layer 440 is only used in the gas-carrying fluid channel, and consequently in the second fluid channel 170. It is however also conceivable that a corrosion-reducing intermediate layer 440 is provided in both fluid channels 140, 170.

In the case of the shell type of construction 230, as shown in FIG. 2, a corrosion-reducing intermediate layer 440 may be provided in the first fluid channel 250 and/or in the second fluid channel 260 or in neither of the fluid channels 250, 260.

Figure 5:
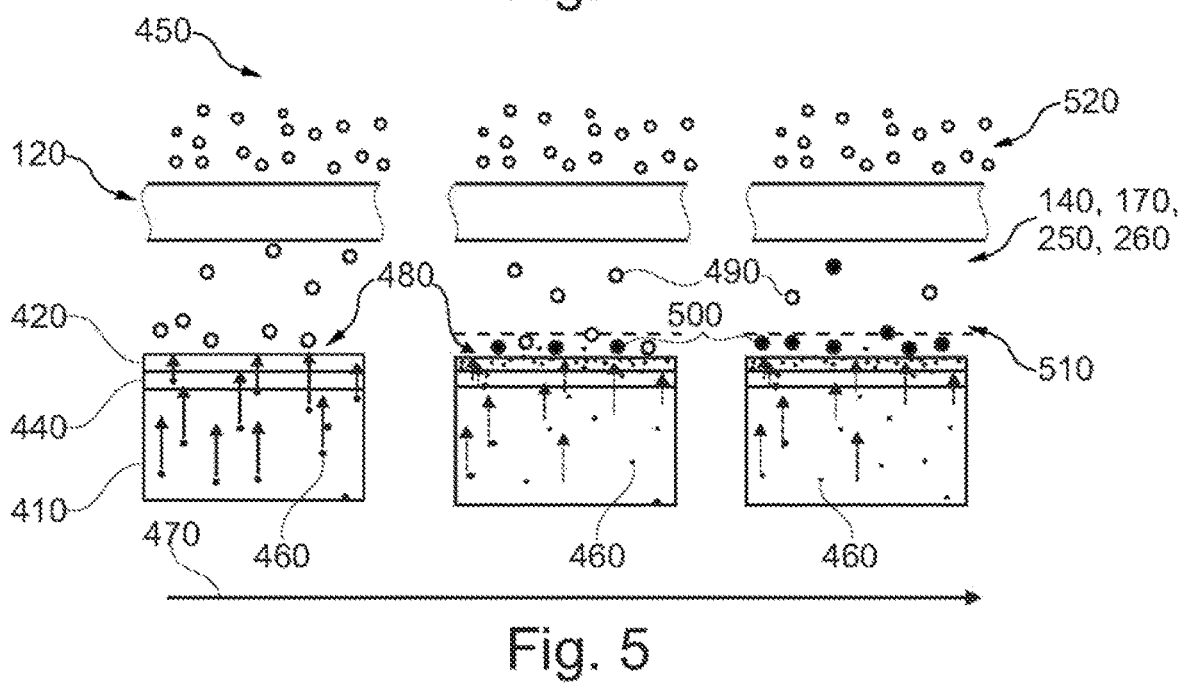
FIG. 5 shows a schematic representation of the gettering effect that has occurred when using semifinished products according to the invention.

In the case of a controlled atmosphere brazing process 450, as shown in FIG. 5, with increasing heating-up 470 the magnesium 460 contained in the core material 410 diffuses out of the middle of the core material 410 to the surface 480 and accumulates there, on the one hand breaking up the superficial oxide film and on the other hand going over at least partially into the gas phase. The oxygen molecules 490 contained in the fluid channels 140, 170, 250, 260 can then react near the surface with the magnesium 460 to form magnesium oxide 500, and thus reduce the free residual oxygen content in the microscopic protective atmosphere region 510, at least just above the surface 480, and possibly in the therein adjoining microscopic protective atmosphere region 510. The fact that the fluid channels 140, 170, 250, 260 are substantially separated fluidically from the macroscopic protective gas atmosphere 520 surrounding the heat exchanger assembly 120 means that the free residual oxygen content can be successfully lowered permanently during the brazing process, at least within the microscopic protective gas atmosphere 510, without the oxygen reduction being impaired again by oxygen penetrating from the macroscopic protective atmosphere 520. Accordingly and in particular in the case of a plate type of construction 110 or a shell type of construction 230, a brazing of a heat exchanger assembly is successfully achieved without using fluxes by means of a controlled atmosphere brazing process 450.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

What is claimed is:

1. A brazeable metal sheet material for improving corrosion resistance for heat exchanger components brazed with at least reduced use of flux in a controlled atmosphere brazing process, comprising:
    a core material layer consisting of an Al3000-series aluminum alloy having a magnesium content of between 0.1% and 1.5% by weight;
    a brazing layer arranged on one side of the core material layer, the brazing layer consisting of an Al4000-series aluminum alloy having a magnesium content of no more than 0.2% by weight; and
    a corrosion-reducing intermediate layer arranged between the core material layer and the brazing layer, the intermediate layer consisting of an Al7000-series aluminum alloy having a magnesium content of between 0.2% and 0.4% by weight,
    wherein the corrosion-reducing intermediate layer is located adjacent to and extends parallel to the core material layer, being adjoined to the core material layer,
    wherein the brazing layer is located adjacent to and extends parallel to the corrosion reducing intermediate layer, being adjoined to the corrosion-reducing intermediate layer, such that the corrosion-reducing intermediate layer is located between the core material layer and the brazing layer, and
    wherein the brazeable metal sheet material is configured such that heating the brazeable metal sheet material causes at least a portion of the magnesium content of the core material layer to diffuse from the core material layer and accumulate on a surface of the brazing layer.

2. The brazeable metal sheet material of claim 1, wherein the core material layer has at least one of a silicon content of 0.0%-1.0% by weight, an iron content of 0.0%-0.7% by weight, a copper content of 0.0%-0.5% by weight, and a manganese content of 0.5%-2.0% by weight.

3. The brazeable metal sheet material of claim 1, wherein the brazing layer has at least one of a silicon content of 6.5%-13% by weight and a zinc content of 0.2%-5% by weight.

4. The brazeable metal sheet material of claim 1, wherein the corrosion-reducing intermediate layer has a zinc content of 0.2%-5% by weight.

5. The brazeable metal sheet material of claim 1, wherein the corrosion-reducing intermediate layer has a thickness of 10-200 μm.

6. The brazeable metal sheet material of claim 1, wherein the brazing layer is a first brazing layer, further comprising a second brazing layer arranged on another side of the core material layer opposite the one side, the second brazing layer having a magnesium content of no more than 0.2% by weight.

7. The brazeable metal sheet material of claim 6, wherein the corrosion-reducing intermediate layer is a first corrosion-reducing intermediate layer, further comprising a second corrosion-reducing intermediate layer arranged between the core material layer and the second brazing layer, the second corrosion-reducing intermediate layer having a magnesium content of between 0.1% and 1.5% by weight.

8. A reduced-flux, controlled-atmosphere brazeable heat exchanger assembly comprising:

a plurality of components produced from a metal sheet material, the metal sheet material comprising
a core material layer consisting of an AL3000-series aluminum alloy with a magnesium content of between 0.1% and 1.5% by weight;
a corrosion-reducing intermediate layer consisting of an AL7000-series aluminum alloy having a magnesium content of between 0.2% and 0.4% by weight; and
a brazing layer consisting of an AL4000-series aluminum alloy with a magnesium content of no more than 0.2% by weight,
wherein the corrosion-reducing intermediate layer is located adjacent to and parallel to the core material layer, being adjoined to the core material layer, and
wherein the brazing layer is located adjacent to and parallel to the corrosion-reducing intermediate layer, being adjoined to the corrosion-reducing intermediate layer, such that the corrosion-reducing intermediate layer is located between the core material layer and the brazing layer,
wherein the plurality of components includes plates or shells arranged in pairs to define first fluid passages for a liquid coolant, each of said plates or shells being arranged so that the corrosion-reducing intermediate layer and the brazing layer are provided between the core material layer and the first fluid passages, and
wherein the brazeable heat exchanger assembly is configured such that heating of the metal sheet material causes at least a portion of the magnesium content of the core material layer to diffuse from the core material layer and accumulate on a surface of the brazing layer to react with oxygen molecules contained within the first fluid passages.

9. The heat exchanger assembly of claim 8, comprising second fluid passages for a flow of charging air arranged between said adjacent pairs of plates or shells.

10. The heat exchanger assembly of claim 8, wherein the brazing layer is a first brazing layer, wherein the metal sheet material has a second brazing layer arranged on another side of the core material layer, and wherein the second brazing layer has a magnesium content of no more than 0.2% by weight.

11. The heat exchanger assembly of claim 10, wherein said plates or shells arranged in pairs additionally define second fluid passages for a flow of charging air, wherein the first fluid passages alternate with the second fluid passages, wherein the first brazing layers of the plates or shells are arranged within the first fluid passages, and wherein the second brazing layers of the plates or shells are arranged within the second fluid passages.

12. The heat exchanger assembly of claim 10, wherein the corrosion reducing intermediate layer is a first corrosion-reducing intermediate layer, wherein the metal sheet material has a second corrosion-reducing intermediate layer arranged between the core material layer and the second brazing layer, wherein the second corrosion-reducing intermediate layer has a magnesium content of between 0.1% and 1.5% by weight, and wherein the second corrosion-reducing intermediate layer is located adjacent to the core material layer, being adjoined to the core material layer, wherein the second brazing layer is located adjacent to the second corrosion-reducing intermediate layer, being adjoined to the second corrosion-reducing intermediate layer.

13. The heat exchanger assembly of claim 8, wherein the corrosion reducing intermediate layer has a thickness of 10-200 μm.

14. The heat exchanger assembly of claim 8, wherein the core material layer has at least one of a silicon content of 0.0%-1.0% by weight, an iron content of 0.0%-0.7% by weight, a copper content of 0.0%-0.5% by weight, and a manganese content of 0.5%-2.0% by weight.

15. The brazeable metal sheet material of claim 1, wherein the magnesium content of the core material layer is identical to the magnesium content of the corrosion-reducing intermediate layer.

* * * * *